(12) United States Patent
Engelen et al.

(10) Patent No.: US 11,177,881 B2
(45) Date of Patent: Nov. 16, 2021

(54) EXCHANGING MESSAGES USING VISIBLE LIGHT

(71) Applicant: SIGNIFY HOLDING B.V., Eindhoven (NL)

(72) Inventors: Dirk Valentinus René Engelen, Heusden-Zolder (BE); Bartel Marinus Van De Sluis, Eindhoven (NL); Dzmitry Viktorovich Aliakseyeu, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 227 days.

(21) Appl. No.: 16/481,156

(22) PCT Filed: Jan. 22, 2018

(86) PCT No.: PCT/EP2018/051431
§ 371 (c)(1),
(2) Date: Jul. 26, 2019

(87) PCT Pub. No.: WO2018/138046
PCT Pub. Date: Aug. 2, 2018

(65) Prior Publication Data
US 2021/0143907 A1 May 13, 2021

(30) Foreign Application Priority Data
Jan. 26, 2017 (EP) .................................. 17153166

(51) Int. Cl.
*H04B 10/116* (2013.01)
*H04W 4/12* (2009.01)
*H04M 1/72436* (2021.01)

(52) U.S. Cl.
CPC ...... *H04B 10/116* (2013.01); *H04M 1/72436* (2021.01); *H04W 4/12* (2013.01)

(58) Field of Classification Search
CPC ...... H04B 10/116; H04W 4/70; H04W 4/029; H04W 4/025; H04W 4/12; H05L 347/13; H04M 1/72436
(Continued)

(56) References Cited

U.S. PATENT DOCUMENTS

2012/0106977 A1 5/2012 Ma et al.
2012/0216127 A1 8/2012 Meyr
(Continued)

FOREIGN PATENT DOCUMENTS

WO 2010100576 A1 9/2010
WO 2014031660 A1 2/2014

*Primary Examiner* — Ted M Wang

(57) ABSTRACT

A mobile device comprising: a processor configured to execute a two-way messaging application, comprising: a message leaving component configured to leave a message to be retrieved via a luminaire by: generating message content according to message generation inputs from a user of a mobile device; using at least one light sensing device to extract, from light emitted by the luminaire, a code embedded in the light as non-visible modulations; and using the received code to cause the message content to be stored in association with the luminaire for retrieval by one or more recipient users; and a message retrieving component configured to retrieve a message via a luminaire of the lighting system by: using the at least one light sensing device to extract the message content or data for retrieving the message embedded in the light as non-visible modulations, and output the message content via a user interface.

12 Claims, 5 Drawing Sheets

(58) Field of Classification Search
USPC .......................................................... 398/172
See application file for complete search history.

(56) References Cited

U.S. PATENT DOCUMENTS

| | | |
|---|---|---|
| 2014/0270796 A1 | 9/2014 | Jovicic et al. |
| 2014/0285096 A1 | 9/2014 | Cuppen et al. |
| 2015/0365787 A1* | 12/2015 | Farrell .................. H04W 4/029 |
| | | 455/456.1 |
| 2016/0091217 A1* | 3/2016 | Verberkt .............. H05B 45/325 |
| | | 700/276 |

* cited by examiner

Add a video message to a light-emitting wish card or jewellery box

Leave a message for friends at a tourist location

_US 11,177,881 B2_

EXCHANGING MESSAGES USING VISIBLE LIGHT

CROSS-REFERENCE TO PRIOR APPLICATIONS

This application is the U.S. National Phase application under 35 U.S.C. § 371 of International Application No. PCT/EP2018/051431, filed on Jan. 22, 2018, which claims the benefit of European Patent Application No. 17153166.8, filed on Jan. 26, 2017. These applications are hereby incorporated by reference herein.

TECHNICAL FIELD

The present disclosure relates to a message exchange system for exchanging messages between users of a lighting system.

BACKGROUND

Coded Light refers to techniques by which data are modulated into light emitted by a light source and is decodable by a receiving device. To do so, the receiving device uses a light detector such as a photodiode or camera to detect the modulations in the light, from which the data can be decoded. The modulations in the light may be implemented by many different modulation techniques such as On-Off Keying, Frequency Modulation, Amplitude Modulation etc.

Preferably the modulations are of a sufficiently high frequency that they do not result in variations to the emitted light intensity which are perceptible to the human eye (though this is not a requirement), but can still be detected by the photodetector. A rolling-shutter camera captures lines of an image at a much higher rate than the framerate of a global-shutter camera and can thus be used to detect modulations at a much higher frequency. In these cases, the modulations in the light appear as a characteristic sequence of light and dark bands in images captured by the rolling shutter camera. Higher frequencies still are detectable using sensors such as photodiodes.

U.S. Patent Application 2012/0106977 A1 discloses a server device to transmit a message through a visible light communication (VLC), in which the server includes a visible light communication unit to transceive data through visible light communication; a message reception unit to receive a message; a message identification unit to identify a receiving object, a message type, and a transmission characteristic of the message; and a message transmission unit to transmit the message to the receiving object according to the transmission characteristic of the message.

SUMMARY

There are both high-tech and low-tech solutions to sending messages between users.

One high-tech solution is messaging via social networks to exchange small pieces of information or even emotions (e.g. using ideograms such as emojis). Some of these messages are only relevant in a certain context.

A low-tech alternative to sending messages is the use of sticky repositionable notes (e.g. Post-it notes) left on an object which is part of the context: e.g. a message on the fridge saying "I left for my yoga lessons, but there is a tasty pasta in the fridge." The messages are typically left by one user and intended for a different user, but a user may also leave notes for themselves (i.e. to remind them at a later time).

Each of these solutions has its pros and cons. For example, social media messaging allows for instant communication between users but requires complex hardware (and power), whereas repositionable notes are simple and do not require a power source but create waste paper. Paper notes can also remain unnoticed by the intended recipient, while with messaging the sender can receive an indication that the message has been seen and/or read by the recipient, which is not possible with paper notes.

More advanced messaging solutions also exist such as the use of geo-fencing to control the moment and context that the receiver gets notified of the message. However, geo-fencing has some limitations on accuracy, e.g. it is difficult to use geo-fencing for messages which are attached to an object (such as a present) that is sent to the receiver, when there is no indication where the present is going to be opened.

Embodiments relate to associating messages with one or more "coded light" devices, enabling receivers to access the message (only) upon detecting corresponding lighting code(s) emitted by the coded light devices (i.e. based on visible light communications, or VLC). Also in embodiments, a sender can compose a message and associate it with the coded light device which stores the message and emits it (or means for the retrieval thereof) as a coded light signal. The coded light device then also provides a visual (noticeable by a human) indication that it is carrying a message, and can be left in an environment in the same way that a repositionable sticky note can. A recipient is able to notice the visual indication and use a detector device (e.g. his smartphone having a camera or photodiode) to retrieve the coded light signal and hence the message. Optionally, the sender can be provided with a notification that the message has been read (cf. instant messaging described above).

The coded light solution of the present invention has the advantages that it can be switched on/off, provide visible indication of available messages, emit a unique access key, can protected from view, be read out from a distance, or be associated with a highly accurate position or visual perspective.

Hence, according to a first aspect disclosed herein, there is provided a mobile device for exchanging messages between users of a lighting system, wherein the lighting system comprises a luminaire for providing illumination, the mobile device comprising: a data interface for transmitting a message to be stored at a memory location externally of the mobile device over one or more wired or wireless networks; a user interface; at least one light sensing device; a processor coupled to a memory configured to hold a two-way messaging application, wherein the processor is configured to execute the two-way messaging application, and wherein the two-way messaging application comprises: a message leaving component configured to leave the message to be retrieved via the luminaire of the lighting system by: generating content of the message according to message generation inputs received via the user interface from a user of the mobile device; using the at least one light sensing device to extract, from light emitted by the luminaire, a code embedded in the light as non-visible modulations; and using the received code to cause the message content to be stored at the memory location in association with the luminaire for retrieval by one or more recipient users; and a message retrieving component configured to retrieve a message via the luminaire of the lighting system by: using the at least one light sensing device to extract, from light emitted by the luminaire, data comprising an identifier of the luminaire, and retrieving the message content from the memory location using the identifier, and output the message content via the user interface for consuming by the one or more recipient users.

That is, a simple two-way messaging application provides both a message-leaving function and a message-retrieval function, to allow a convenient two-way message exchange between users.

In embodiments, the mobile device may comprise a memory configured to hold the application for execution on the processor. That is, the memory may be comprised in the mobile device itself. Alternatively, the application can be downloaded from an external storage location into the memory for execution.

In embodiments, the message leaving component is configured, in response to detecting the embedded code, to notify the user, via the user interface, that he can leave a message for retrieval via the luminaire.

In embodiments, the user interface comprises a display, wherein the message leaving component is configured to render a text input region on the display and the content of the left message comprises a character string generated by the user in the text input region, wherein the message retrieving component is configured to display a character string of the retrieved message directly on the display.

In embodiments, the character string is inputted as free-text.

In embodiments, the message leaving component is configured to cause a visible change in the light emitted by the luminaire for notifying the one or more recipient users of the left message.

In embodiments, the message leaving component is configured to cause the message content to be stored in association with the code in a memory location accessible to the one or more recipient users, thereby causing it to be stored in association with the luminaire for retrieval using the code; wherein the data for retrieving the message comprises a code, and the message retrieving component is configured to use that code to retrieve the message content from a memory location at which it is stored in association with that code.

In embodiments, the message leaving component is configured to cause the message content to be stored in a memory location accessible to the luminaire for embedding in the light emitted by the luminaire as non-visible modulations, thereby causing the message content to be stored in association with the luminaire.

In embodiments, the message leaving component is configured to cause the message content to be stored at a memory location accessible to the one or more recipient users, and cause a link to that memory location to be embedded in the light emitted by the luminaire as non-visible modulations, thereby causing the message content to be stored in association with the luminaire; wherein the data retrieving the message comprises a link to a memory location, and the message retrieving component is configured to use that link to retrieve the message content from that memory location.

In embodiments, the link is a Uniform Resource Identifier (URI).

According to a second aspect disclosed herein, there is provided a computer-implemented method of exchanging messages between users of a lighting system, wherein the lighting system comprises a luminaire for providing illumination, the method comprising executing a two-way messaging application on a processor of a mobile device, wherein the two-way messaging application, when executed, performs operations of: leaving a message to be retrieved via the luminaire of the lighting system by: generating message content according to message generation inputs received via a user interface from a user of a mobile device; using at least one light sensing device to extract, from light emitted by the luminaire, a code embedded in the light as non-visible modulations; and using the received code to cause the message content to be stored at a memory location externally of the mobile device over one or more wired or wireless networks in association with the luminaire for retrieval by one or more recipient users, and retrieving a message via the luminaire of the lighting system by: extracting, from light emitted by the luminaire, data comprising an identifier of the luminaire, and retrieving the message from the memory location using the identifier, and outputting the message content via a user interface to the one or more recipient users.

According to a third aspect disclosed herein, there is provided a computer program product comprising a two-way messaging application stored on a computer-readable storage medium for execution on a processor of a mobile device, the two way messaging application comprising: a message leaving component configured to leave a message to be retrieved via a luminaire of the lighting system by: generating content of the message according to message generation inputs received via a user interface from a user of the mobile device; using at least one light sensing device to extract, from light emitted by a luminaire, a code embedded in the light as non-visible modulations; and using the received code to cause the message content to be stored externally in association with the luminaire for retrieval by one or more recipient users; and a message retrieving component configured to retrieve a message via a luminaire of the lighting system by: using the at least one light sensing device to extract, from light emitted by the luminaire, content of the message or data for retrieving the message content embedded in the light as non-visible modulations, and output the message content via the user interface for consuming by the one or more recipient users.

According to a fourth aspect disclosed herein, there is provided a message exchange system for use in a lighting system, the message exchange system for exchanging messages between users of the lighting system, the message exchange system comprising: a lighting controller for controlling a luminaire one or more illumination sources of the lighting system to emit light; a message interface for receiving, from a messaging user, a message having message content intended for a recipient user; a storage component configured to store the received message content at a storage location; wherein the lighting controller comprises: a first control module configured to control the luminaire in response to receiving the message to emit a new message notification as a visual effect of the light emitted by that luminaire thereby notifying the recipient user of the message content; and a second control module configured to control the luminaire to embed in its emitted light, as non-visible modulations, the message content or data for retrieving the message content from the storage location, thereby rendering the message content available to the recipient user.

The primary function of the lighting system and the luminaire is providing illumination by emitting light. The present invention exploits this emitted light to provide a secondary message exchange function, whereby not only is a visual change in the emitted light used to notify the recipient user of the new message content, but non-visible modulations in the emitted light are used to actually render that content accessible based on VLC.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

Figure 1:
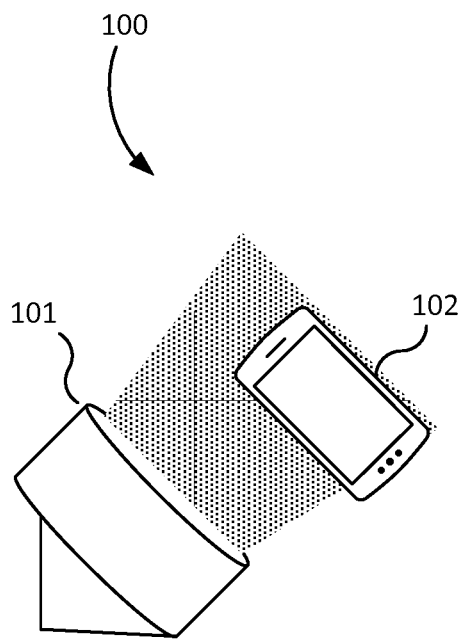
FIG. 1 shows a visible light communications system.

FIG. 1 shows a system 100 comprising a lighting device 101 acting as an illumination source and a receiving device 102. The lighting device 101 is a luminaire and may comprise one or more individual illumination sources (e.g. one or more individual LEDs or filaments). The lighting device (lamp) 101 may be portable such that a user can move it around an environment such as his home. In any case, the lamp 101 is arranged to act as an illumination source by emitting light, and to be able to modulate a signal in the emitted light to encoded data, as is known in the art of visible light communications.

The emitted light is detectable by the receiving device 102, e.g. a (mobile) smart phone, using a light sensor such as a photodiode or camera of the receiving device 102, and hence the (portable) lamp 101 is identifiable by the receiving device 102 using known coded light techniques.

Note that techniques for the transmission of data in general via a modulated light signal are known in the art. This applies to both the transmit and receive sides of the system. That is, it is known how to take an arbitrary data string such as a message and encode it as modulation in light, and it is also known how to capture this light at a receiving device and to decode the data such that, for example, the message can be read by the receiving device.

In some embodiments, the lighting device 101 is arranged to receive a message from a user (via a first user device), and to store this message in a memory. A second user (using a second user device), or even the first user at a later time, can then retrieve the message via coded light from the lighting device 101. To aid in this, the lighting device 101 is arranged to emit a visual indication that it is currently storing a message, e.g. by changing the colour of its emitted light. Alternatively, the message can be received and stored elsewhere in the system, though the luminaire 101 is still used to convey the message to its intended recipient.

In embodiments of the present invention, a person (sender) uses a first user device (e.g. a smartphone) to write a message, optionally specify intended receiver(s), and then transmit this message to the lamp 101, or to a server in the network.

Figure 2:
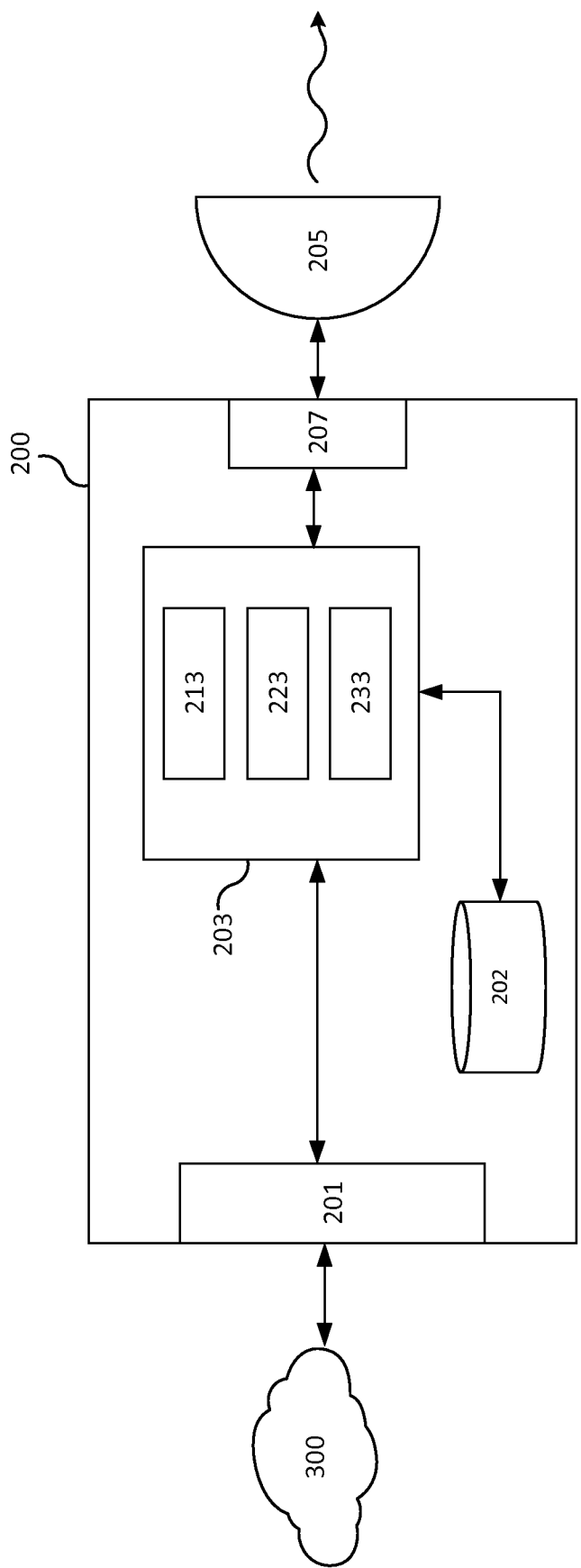
FIG. 2 is a schematic diagram of a controller in accordance with embodiments of the present invention.

FIG. 2 is a block diagram illustrating a lighting system controller 200 in accordance with embodiments of the present invention. The controller 200 comprises a message interface 201, a processer 203 such as a CPU or interconnected CPUs, and a control interface 207. Via the control interface 207, the controller 200 is connected to at least one illumination source 205. The controller 200 also optionally comprises a memory 202 as shown in FIG. 2. The processor 203 is operatively coupled to each of the interface 201, the memory 202, and the illumination source 205 in that it is at least arranged to receive data from the interface 201, provide data to the illumination source 205 and has access to the memory 202 for storing and retrieval of data. It is appreciated though that any or all of these connections may be bi-directional, as shown in FIG. 2.

The controller 200 is implemented in the system 100 shown in FIG. 1. For example, the controller 200 may be implemented entirely in software running on hardware local to the illumination source 101. For example, both the controller 200 and the illumination source 205 can be embodied in the luminaire 101 (i.e. the same luminaire) such that the control interface 207 is internal to the luminaire 101. Alternatively, some functionality may be performed by dedicate hardware of the illumination source 101. Further, the controller 200 may be implemented in a distributed manner in which some functionality is implemented locally at the illumination source 101 and some other functionality (e.g. the memory 202, as described in more detail below) implemented externally such as on one or more remote servers accessible by the illumination source 101 over a wired or wireless network. Alternatively, the controller 200 can be embodied in an external device, such as a gateway to the lighting system (sometimes called a bridge), and the control interface 207 can be a network interface (e.g. wireless interface) via which the controller 200 connects to the luminaire 101 comprising the illumination source 205. For example, based on ZigBee, WiFi, Bluetooth etc.

Three modules are shown as functional blocks comprising code running on the processor 203: a lighting effect component 213 (first control module), a modulation component 223 (second control module), and a storage component 233. These are described herein as separate components or modules, but it is understood that two or more of these components can be performed as a single block of code running on the processor 203, or as a single dedicated piece of hardware. For example, the functionality ascribed herein to the lighting effect component 213 and modulation component 223 may be performed by a single lighting component arranged to perform both functionalities.

The interface 201 comprises one or more ports for communicating with a network 300 according to one or more wired or wireless communications protocols. For example, the interface 201 may comprise a microwave transceiver arranged to receive (and transmit) data according to the WiFi standard. The interface 201 may also be configured according to any other suitable wired or wireless connection, along with the associated hardware, as are well known in the art and so not described in more detail here.

The at least one illumination source 205 comprises one or more individual light sources arranged to emit light into an environment (e.g. a room of a user's house). The light sources can be any suitable light source such as LEDs or incandescent bulbs. In some embodiments, the illumination source 205 comprises a plurality of LEDs and can both vary a property of the light emitted by the LEDs (e.g. the hue, brightness, and/or saturation) in a visual manner such that the change is noticeable by a human user, and also can modulate a property of the light (e.g. the brightness) in a manner imperceptible to the human user in order to transmit data, as mentioned above.

The memory 202 (storage location 202) comprises one or more electronic memory units which may be internal to the controller 200 as shown in FIG. 2, or may be external (e.g. accessible over a network 300 and/or The Internet using the interface 201 or another interface). In either case, the memory 202 is a storage location which is accessible by the processor 203 of the controller 200.

The lighting effect component 213 is arranged to control the illumination source 205 to emit a visual lighting effect, e.g. by controlling at least one of the brightness, hue, and saturation of the emitted light. It is understood that the lighting effect component 213 controls the emitted light in a broad sense, and that simply turning the illumination source 205 ON/OFF can be considered as controlling a lighting effect. It is also understood that the lighting effect component 213 controls visual lighting effects rendered by the illumination source 205 (i.e. perceptible by a human user) and this is what separates the functionality of the lighting effect component 213 from that of the modulation component 223 described below. However, as mentioned, the distinction is only made here for the purposes of explanation, and the lighting effect component 213 and modulation component 223 may be provided by a single component such as a single software algorithm or single dedicated hardware circuit.

The modulation component 223 is arranged to control the illumination source 205 to module its emitted light in order to embed data in the emitted light, e.g. as AM or FM modulations or any other modulation scheme known in the art of visible light communications. These modulations are of a sufficiently high frequency that they are imperceptible to a human user. That is, such that the human user is unable to distinguish, by eye, between a light effect having an embedded signal and the same light effect with the embedded signal removed.

The storage component 233 is configured to access memory 202 to store and retrieve data. As mentioned above, the memory 202 may be a remote storage location, in which case the storage component 233 is arranged to be able to access the memory 202 via a wired or wireless network e.g. using interface 201 or another interface.

In operation, the lighting effect component 213 controls the illumination source 205 according to user input and/or one or more predefined rules. User input may be received via interface 201 from a user device or switch and instruct the lighting effect component 213 to change the lighting effect provided by the illumination source 205. As mentioned above, this may comprise turning the illumination source 205 ON/OFF, or may comprise changing the colour of the emitted light. Predetermined rules may be stored in memory (e.g. memory 202 or another storage location not shown in FIG. 2) which defined behaviours for the illumination source 205. The lighting effect component 213 may access this memory to retrieve the stored rules and control the illumination source 205 accordingly. For example, a rule might specify a particular lighting effect (e.g. a sunset effect comprising a red hue) to be rendered at specific times of day (e.g. in the evening), or may specifying an effect (e.g. bright white light) to be rendered in response to sensor input (e.g. a motion sensor in the same environment as the illumination source 205. The sensor of the latter case is not shown in FIG. 2, but sensor-controlled lighting is well known in the art. Data from a presence sensor can be communicated to the lighting effect component 213 via a wired or wireless network (e.g. network 300) and received via an interface (e.g. interface 201) to be processed by the lighting effect component in applying the predetermined rule(s).

The above-outlined control of the illumination source 205 by the lighting effect component may be considered "normal operation" of the illumination source 205 in that the rendering of lighting effects in accordance with user input and/or predetermined rules is known in the art. The present invention provides additional functionality described below.

The processor 203 receives a message via the interface 201 from a user device (e.g. a user's smart phone). The message may comprise a text string, one or more ideograms (e.g. emojis), audio files, pictures or videos, or links thereto (e.g. URLs) or other forms of message content. In response to receiving the message, the storage component 233 stores the message in memory 202 for use by the processor 202. The lighting effect component 213 then controls the illumination source 205 to emit a "new message notification" as a visual indication in the light emitted by the illumination source 205. This notification may comprise changing a hue, brightness, or saturation of the emitted light, and/or may comprise turning the light ON or OFF, or flashing (repeatedly turning ON/OFF) the light. Any visual lighting effect which is noticeable by a human user can be used. If the illumination source 205 was ON before receipt of the message, this comprises changing the light output by the illumination source 205 to that of the new message notification. If the illumination source 205 was OFF, this comprises turning the illumination source 205 ON to render the new message notification. In either case, the new message notification comprises a visual indication which the human user will understand as an indication that there is a message stored in memory (memory 202). The new message notification may comprise a static light effect (e.g. a static colour) or may be dynamic (e.g. a sequence of colours).

The fact that there is a message stored in memory 202 is thereby indicated to human users within the environment. Hence, a user (i.e. the user who provided the message or a further user) can easily tell at a glance that there is a message to be retrieved. To retrieve the message, the second user sends a retrieval request to the processor 203 which prompts the modulation component 223 to access the memory 202 and to embed the message (or an indication thereof) in the emitted light as a coded light message. The second user can then use a camera (or other light-sensing device) e.g. of their user device to decode the embedded message and therefore read the message out. The message may then be displayed on a screen of the user device, or play back via speakers. In cases where an indication of the message is embedded, this may comprise decoding a reference to the memory 202 such that the user's user device is able to access the memory 202 to retrieve the message (e.g. the reference may be a network address of the memory 202).

The retrieval request may comprise input from a user device of the second user, or may comprise input from a switch on the lighting device 101 (e.g. on the illumination source 205 or a physical housing thereof). That is, the second user may be able to indicate to the processor 203 that he wishes to "release" the message by pressing such a button, which causes the modulation module to embed the message (or indication) in the emitted light.

In a simple embodiment, the modulation component 223 may embed the message or indication in directly in response to receipt and storage of the message, instead of waiting for a retrieval request. This may have the advantage of simplifying the retrieval by the second user as he does not have to first cause the modulation component 223 to embed the message/indication.

In embodiments, the illumination source 205 has a unique and fixed (coded) light identifier (ID) (as may be the case in some lighting systems). In this case the message is associated with this fixed ID (or multiple IDs in case of multiple light sources) by storing the message in memory 202 in association with the fixed ID. When the smart device of the receiver reads the ID, it is able to access memory 202 and retrieve the message stored along with that ID. It may not be possible to store the message in the light source itself, in which case the memory 202 described here will need to be an external memory (as mentioned above).

Advantageously, this allows the message exchange to take place even though the VLC information modulated into the light cannot be controlled or altered. Note, in this case the second control module 223 can for example be fixed-logic circuitry of the luminaire 101 that provides the fixed code.

In order to leave the message, the user device of the user wishing to leave the message (first user) can for example receive the coded light ID (code) from the lamp, and store the message in association with that ID. This requires the messaging user's device to receive the code from the illumination source before he can upload a message.

Once the user device has received the coded light ID (which specifies the lamp to be used by the second user during retrieval as described herein) it can either store the message in association with that ID or use the ID to identify a network address of that lamp in order to transmit the message content itself to that lamp. In the latter case, the lamp can then cease emitting the ID and being emitting the message content as a coded light signal.

Concerning the first user (the user who left the message), they may provide the message to the processor 203 via a wired or wireless connection such as WiFi or Bluetooth. It is appreciated that this may be a different communication means from that used to receive the message described above, and hence may use a different interface (not shown) from interface 201, or at least a different port of the interface 201. It is therefore also appreciated that the first user may provide the message while not himself in the vicinity of the lamp. In that case, if there are more than one luminaires in the user's lighting system, he can select the illumination source 205 from a list (e.g. "kitchen counter lamp") and the storage, visual indication, and coded light transmission thereof as described herein will only be performed for that illumination source.

Optionally, the first user may also specify one or more target receiver(s), i.e. target human users (recipients) or respective user devices thereof, e.g. by selecting one or more contacts, or specifying a specific group or receivers (e.g. a social media group) on the user device of the first user. This is advantageous as then the visual indication provided can be particular to a specific one or more intended recipients. For example, each user may have a particular assigned lighting effect (e.g. assigned colour), which may be set by one or more of the users and stored in memory (e.g. memory 202) accessible by the processor 203. Then, when a message, e.g. for User A, is stored in memory 202, the lighting effect component can access the memory to retrieve the assigned lighting effect for User A and control the illumination source 205 to render that effect. This way, the users are not only informed that there is a message, but that the message is intended for User A.

Optionally, a message may be coupled to multiple light codes or a light code pattern, this may be useful if the message should be coupled to an accurate position or a specific visual user perspective. In other words, a message can be associated with two or more light codes and only sent to a user's user device when that device provides the processor 203 with all the light codes. This assures that a certain accurate position of the recipient user is taken, because only at that position will all of those particular light codes be detectable.

Optionally, the first user (the "sender" of the message) is informed upon retrieval of the message that the message has been retrieved (e.g. a "message read" notification). This may be performed by either the processor 203 or the receiving device (the second user's user device). That is, the processor 203 can transmit a "message read" notification to the first user's user device in response to the retrieval request described above, or the second user's user device can transmit the notification in response to retrieval of the message.

As the lamp 101 is portable, it can be placed into a context (e.g. near the fridge), or the lamp 101 can be sent as a present. When the lamp 101 is switched on (or detects via a sensor that an enclosing package is opened), it starts e.g. emitting a visible colour sequence modulated with the light code (message or indication thereof). The recipient user is therefore informed, via the visible colour sequence, that there is a message, and enabled to receive the message via the modulations in the light. Note that without the visual indication the user would be unaware that there was a message or that there was coded light being emitted by the lamp 101.

As mentioned above, a message may be intended for a particular recipient. This can be built upon: some measures can be taken to address a specific receiver: one particularly advantageous method is to use a public-private key combination of the receiver. The message is encoded with the public key, so it can only be decoded with the private key of the receiver.

In embodiments, the emission of the visible indication, e.g. colour or sequence of colours, indicating the presence of a message is only enacted by the lighting effect component 213 in response to a determination that a user is present within the environment. E.g. by presence detection in the environment or geo-fencing on the recipient's smart device (the latter even allows for a determination that the particular user who is the intended recipient is present). In these cases, the lamp 101 will only start emitting the notification light (and optionally code) when a person is near or even when the target person is near the lamp 101. Before this presence detection, the lamp 101 may be rendering a normal lighting effect as mentioned above.

In embodiments, in case of the connected home system the message could also prompt the system to perform additional actions. For example if the message is read it might in addition trigger one or more connected home automated behaviours such as activating a specific light setting (for the lamp 101 and/or other lamps 101 of the system), switching on or off connected home appliance, etc.

The present invention allows for a variety of advantageous uses. A few of these are described in some detail below with reference to FIGS. 3A-D, but it is understood that these examples are for the purposes of description only.

Figure 3B:
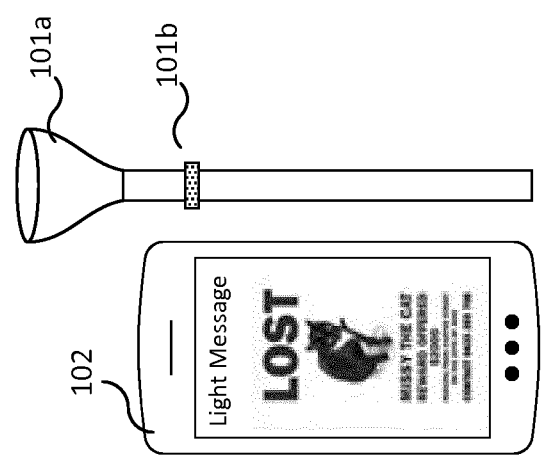
FIGS. 3A-D illustrate various example use cases of the present invention.
Figure 3A:
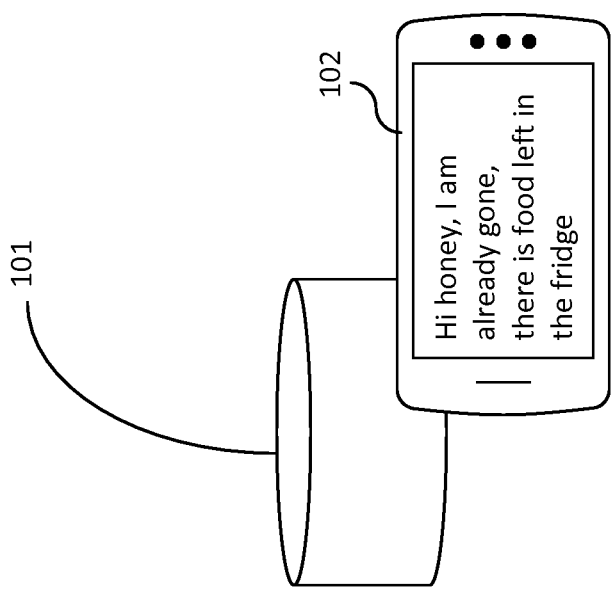

FIG. 3A shows a portable lamp 101 on a kitchen counter set to visually indicate that there is a message (e.g. by turning green). This is analogous to the first user leaving a repositionable sticky note in the kitchen. As shown in the figure, the message is read out by a smartphone of a second user who enters the kitchen at a later time and notices that there is a message left "on" the lamp 101.

FIG. 3B shows an outdoor lamp 101 with separate illumination sources for message indication and message transmission. In this example, a first illumination source 101*a* is arranged to be controlled by the lighting effect component 213 to provide the visual indication, and a second illumination source 101*b* is arranged to be controlled by the modulation component 223 to transmit the message (or indication thereof).

Figure 3D:
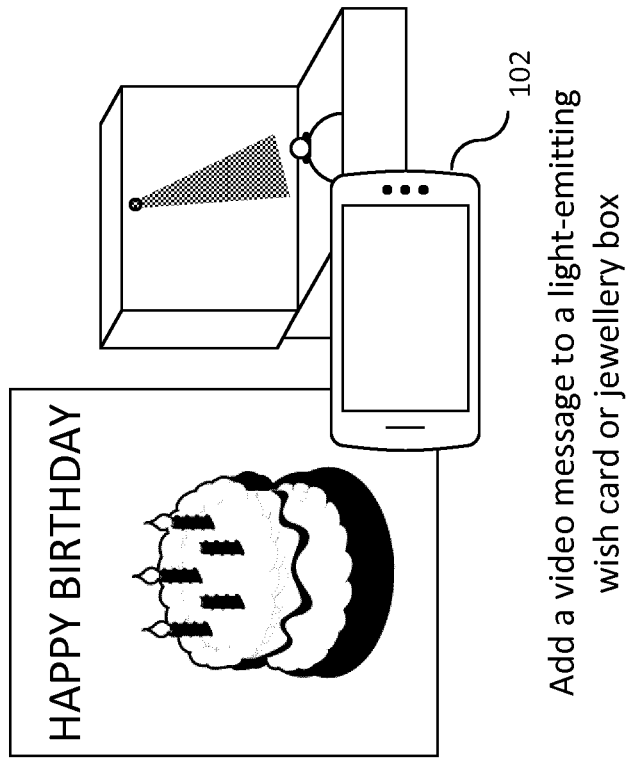
Figure 3C:
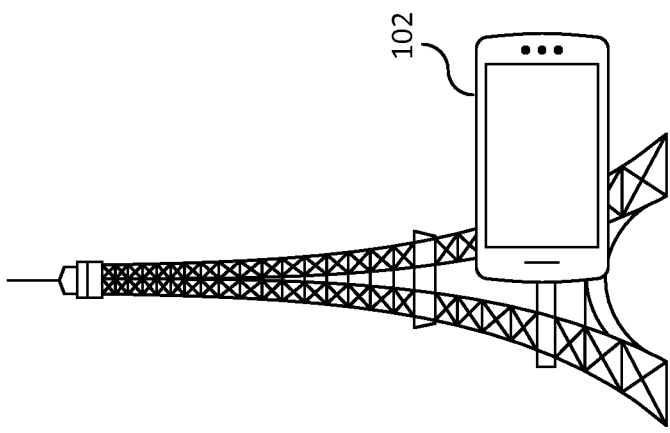

FIG. 3C the message is associated to one of a plurality of lights of an infrastructure (e.g. the Eiffel Tower as shown in the figure), and the receiver of the message gets some clue on the location of the messaging light when he is in the vicinity of this environment (e.g. via a beacon/light map of interesting lamps). This can either be by that one of the plurality of lights visually indicating that it is outputting the message (e.g. by emitting a different colour from the other lights). As there may be a great number of lights (e.g. the Eiffel Tower has more than 20,000 lights) and visitors (e.g. the Eiffel Tower can have over 6 million visitors in a year), a clue can be very helpful to find the message back.

In embodiments, particularly in the public infrastructure example given above, a lot of messages of a lot of visitors may be present (i.e. associated with the lights of the infrastructure). In these case, the clue may be provided to the user by a social media app on their user device. For example: based on the location of a user (e.g. near the Eiffel Tower), he receives a message via his user device that some friends took a picture at a certain nearby position and left a message in one of the lights at the stairwell near the restaurant "Le Jules Verne" in the Eiffel Tower. The user is then able to scan a few lights in this vicinity using a camera of his user device to retrieve the message. In embodiments, he may be further helped by a visual indication such as a colour of the lights which indicates the location of the light sources emitting the light code for the message.

FIG. 3D the message can be associated to the present or the packaging of a present which are sent to the recipient. For example, a light emitting wish card or a jewelry box.

Figure 4:
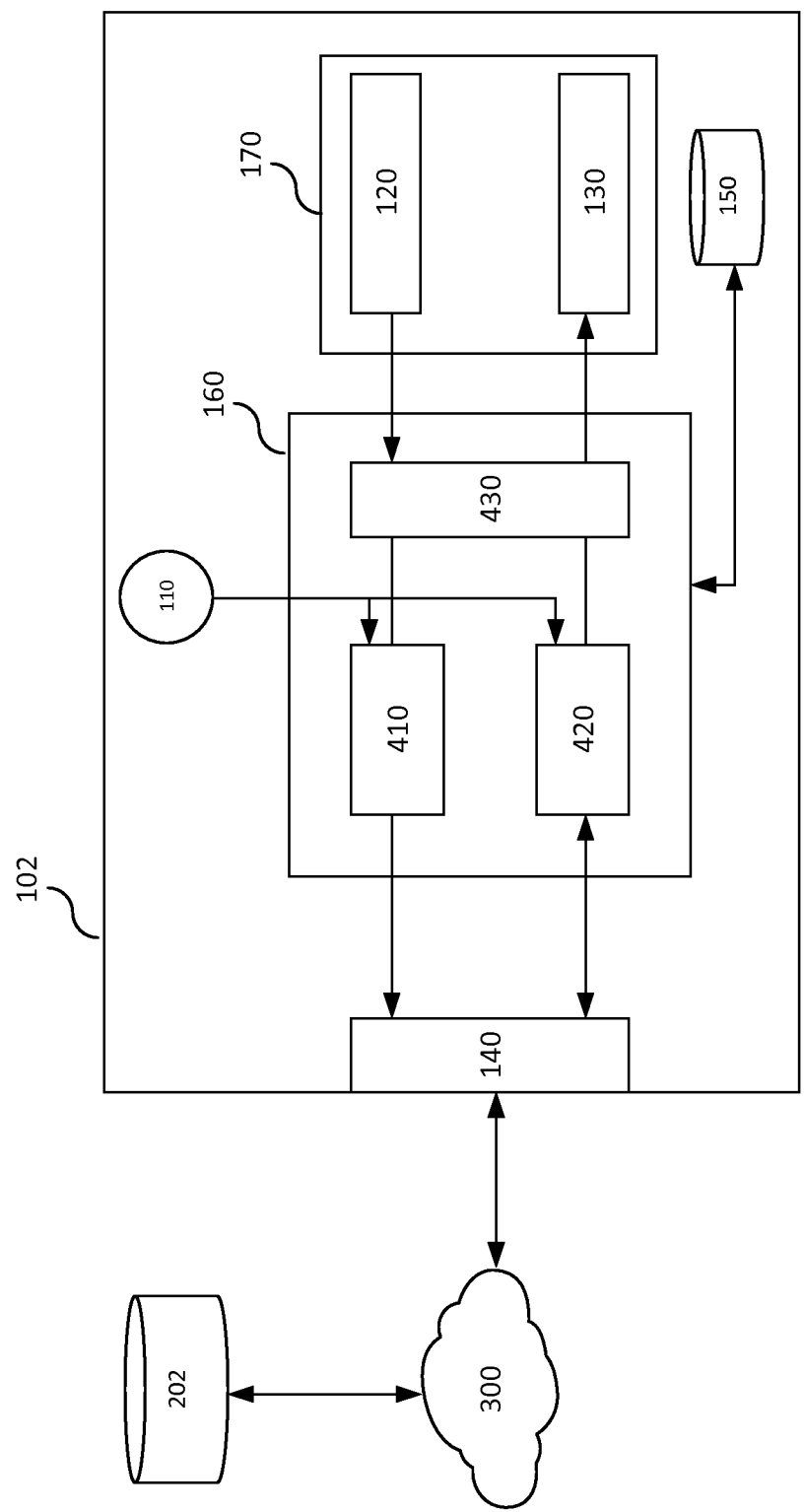
FIG. 4 shows a more detailed view of the mobile device.

FIG. 4 shows the mobile device 102 in more detail than described above. The mobile device comprises: a data interface 140; a user interface 170; at least one light sensing device 110; a memory 150; and a processor 160.

The data interface 140 comprises one or more network interface modules allowing for the at least transmission by (and optionally reception of) data by the mobile device 102 over one or more wired or wireless networks, as is well known in the art, so that it can be stored externally of the mobile device.

The user interface 170 comprises an input device 120 (e.g. a touchscreen or physical keyboard for the input of text by a user, or a microphone for the input of voice commands etc.) and an output device 130 (e.g. a display such as an OLED or LCD screen for displaying text to the user, a loudspeaker for the output of audio to the user, or a light source for the output of a visual indication to the user etc.).

The at least one light sensing device 110 is a camera (either global shutter or, preferably, rolling shutter camera) device, a photodiode, or any other suitable device. Visible Light Communications (VLC) is a term of art which refers to the transmission of (arbitrary) data by embedding the data as modulations of a light source (typically outputting light having a wavelength in the human-visible range). The at least one light sensing device 110 is provided in the mobile device 102 as a means by which light emitted by the light source 205 can be captured for the purposes of processing it to decode embedded data, as described above. Hence, it is understood that "any suitable device" here refers to any light sensing device or devices which can be used in the detection of light for the purposes of VLC. For example, light sensors having high sample rates such as rolling shutter cameras (and also lower sample rates as found in global shutter cameras) are suitable to detect modulations up to the Nyquist limit for that particular sample rate. Cameras have the advantage of ubiquity in modern mobile devices, but it is not excluded that a dedicated light sensor such as a photodiode could be used.

The memory 150 is configured to store a two-way messaging application, described in more detail below.

The processor 160 comprises one or more processing units (e.g. one or more individual FPGAs or ASICs) and is coupled to the memory 150. The processor 160 is configured to execute the two-way messaging application, accessible from the memory 150, to perform the steps as described herein.

The two-way messaging application ("the app") comprises: a message leaving component 410; a message retrieving component 420; and an interface component 430. These components of the app are presented for the ease of understanding and represent functional blocks providing specific functionality of the app itself. Hence, it is appreciated that some or all of these blocks may be embodied in and performed by the same script of code running on the processor 160.

The interface component 430 is configured to send data to and receive data from the user interface 170. That is, at least to receive user input data via the input 120, and to send data to be presented to the user to the output 130.

The message leaving component 410 of the app is configured to perform the steps of leaving a message to be retrieved via a luminaire of the lighting system as mentioned above. The user provides message generation input to the app via input 120 (e.g. by typing a message on a touchscreen) which is received by the message leaving component 410. In response to receiving the message generation input, the message leaving component 410 generates content of the message. This may be by simply "reading off" the user input (e.g. if the user input is a text message provided via a touchscreen, the message leaving component 410 can directly use the provided text as the message content) or may require processing (e.g. if the user input is a link to a video or other type of file at a storage location which is intended to be the message content, the message leaving component 410 will first retrieve the message content from the storage location via interface 140 and then use the retrieved file as the message content).

The message leaving component 410 also receives a signal from the light sensor 110 as the light sensor captures light emitted by the light source 205. From this, a code embedded in light emitted by the luminaire 205 can be decoded. The message leaving component 410 may receive this as a raw signal and perform the necessary processing known in the art in order to extract the code, or may receive it in a pre-processed (or even fully processed) form. In any case, the message leaving component 410 determines the code received from the luminaire 205.

The message leaving component 410 then uses the received code to cause the message content to be stored in association with the luminaire for retrieval by one or more recipient users. This comprises sending the message content to memory 202 via network 300 using interface 140 for storage. If the memory 202 is local to the luminaire 200 as shown in FIG. 2, this is considered "in association with the luminaire" in that the message content is emitted as a VLC signal by that luminaire. If the memory 202 is an external memory location (e.g. an external server accessible by both the mobile device 102 and luminaire 200) then the message content is stored to memory 202 "in association with the luminaire" by storing the message content in memory 202 along with the code of the luminaire 200. In either case, the luminaire 200 is able to access the memory 202 to retrieve the message content, as mentioned above.

The code can be used as an "index" for storing the message for later retrieval (useful particularly when the code is fixed). Alternatively, the code can be used by the mobile device to identify the luminaire, which in turn allows it to cause a link to the message content, or the message content itself, to be embedded in the identified luminaire's emitted light. For example, by directly instructing the luminaire to embed the link/content, or instructing a controller of the luminaire (such as a bridge of the lighting network to which the luminaire belongs).

At this point, i.e. after the steps performed by the message leaving component 410, a message has been left by the user for retrieval by another user. The message leaving component 410 may also cause the luminaire 200 to provide a visual indication that a message has been left in order to notify another user that a message is available for receiving. This other user may be the same user at a later point in time or may be a different user. Hence, it is understood that the following description of message retrieval by a user using the mobile device 102 refers to either the user who left the message using the (same) mobile device 102 to retrieve the message, or a further user using a different mobile device to retrieve the message. In the latter case, the different mobile device is substantially the same as the first in that it also comprises a processor 160 running the two-way messaging app (and is therefore also enabled to leave messages).

To perform message retrieval, the message retrieving component 420 uses the at least one light sensing device 110 to extract, from light emitted by the luminaire 200, either: content of the message; or data for retrieving the message embedded in the light as non-visible modulations.

In the former case, the message content is retrieved from memory by the luminaire and emitted as a VLC signal, as described above, and hence the message content is directly determinable by the mobile device 102. This may be preferable if the message content is a small data file such as a short text string.

In the latter case, the message content is not itself transmitted by the luminaire 200. Instead, the luminaire 200 controls the light output of the light source 205 to emit a link (such as a URI) to the storage location (wherever that may be in memory 202). The mobile device 102 therefore, in these cases, receives the link as a VLC signal and uses it to retrieve the message content from the memory location indicated therein.

In any case, the app retrieves the message content and, using interface component 430, sends it to output 130 for consuming by a user of the mobile device. This may comprise displaying the message content on a display or screen, playing audio content back via speakers, etc. For example, the message retrieving component 420 may be configured to display a character string of the retrieved message directly on the display of the mobile device 102, such that each character of the text is rendered visible to the user on the display.

From the above description, it is understood that the mobile device 102 enabled with the app running on a processor 160 allows messages to be left "at" a luminaire in a manner which has similarities with traditional sticky notes (as mentioned above) but with at least one major advantage in that no waste is produced (as opposed to disposing of used sticky notes). The message content itself used in embodiments of the present invention is arbitrary—a user can leave a message of any type or length. For example, the user leaving the message may input the message content a free-text in a text input field of the input 120 (e.g. a text box, via a keyboard). In this context, "free-text" means that the user can enter any desired text and is not restrained to a particular text format (though he may be limited to a particular length, e.g. a set number of letters or ASCII characters).

The message leaving component 420 may be configured, in response to detecting the embedded code, to notify the user, via the user interface, that he can leave a message for retrieval via the luminaire. It will be appreciated that the above embodiments have been described only by way of example. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A mobile device for exchanging messages between users of a lighting system, wherein the lighting system comprises a luminaire for providing illumination, the mobile device comprising:
   a data interface for transmitting a message to be stored at a memory location externally of the mobile device over one or more wired or wireless networks;
   a user interface;
   at least one light sensing device;
   a processor coupled to a memory configured to hold a two-way messaging application, wherein the processor is configured to execute the two-way messaging application, and wherein the two-way messaging application comprises:
   a message leaving component configured to leave the message to be retrieved via the luminaire of the lighting system by: generating content of the message according to message generation inputs received via the user interface from a user of the mobile device; using the at least one light sensing device to extract, from light emitted by the luminaire, a code embedded in the light as non-visible modulations; and using the received code to cause the message content to be stored at the memory location in association with the luminaire for retrieval by one or more recipient users; and
   a message retrieving component configured to retrieve a message via the luminaire of the lighting system by: using the at least one light sensing device to extract, from light emitted by the luminaire, data comprising an identifier of the luminaire, and retrieving the message content from the memory location using the identifier, and output the message content via the user interface for consuming by the one or more recipient users;
   wherein the message leaving component is configured to cause the message content to be stored at a memory location accessible to the one or more recipient users, and cause a link to that memory location to be further embedded in the light emitted by the luminaire as non-visible modulations, thereby causing the message content to be stored in association with the luminaire;

wherein the data retrieving the message comprises a link to a memory location, and the message retrieving component is configured to use that link to retrieve the message content from that memory location.

2. A mobile device according to claim 1, wherein the message leaving component is configured, in response to detecting the embedded code, to notify the user, via the user interface, that he can leave a message for retrieval via the luminaire.

3. A mobile device according to claim 1, wherein the user interface comprises a display, wherein the message leaving component is configured to render a text input region on the display and the content of the left message comprises a character string generated by the user in the text input region, wherein the message retrieving component is configured to display a character string of the retrieved message directly on the display.

4. A mobile device according to claim 3, wherein the character string is inputted as text.

5. A mobile device according to claim 1, the message leaving component is configured to cause a visible change in the light emitted by the luminaire for notifying the one or more recipient users of the left message.

6. A mobile device according to claim 1, wherein the link is a uniform resource identifier.

7. A computer-implemented method of exchanging messages between users of a lighting system, wherein the lighting system comprises a luminaire for providing illumination, the method comprising executing a two-way messaging application on a processor of a mobile device, wherein the two-way messaging application, when executed, performs operations of:

leaving a message to be retrieved via the luminaire of the lighting system by: generating message content according to message generation inputs received via a user interface from a user of a mobile device; using at least one light sensing device to extract, from light emitted by the luminaire, a code embedded in the light as non-visible modulations; and using the received code to cause the message content to be stored at a memory location externally of the mobile device over one or more wired or wireless networks in association with the luminaire for retrieval by one or more recipient users, and retrieving a message via the luminaire of the lighting system by: extracting, from light emitted by the luminaire, data comprising an identifier of the luminaire, and retrieving the message content from the memory location using the identifier, and outputting the message content via a user interface to the one or more recipient users;

wherein the message leaving component is configured to cause the message content to be stored at a memory location accessible to the one or more recipient users, and cause a link to that memory location to be further embedded in the light emitted by the luminaire as non-visible modulations, thereby causing the message content to be stored in association with the luminaire;

wherein the data retrieving the message comprises a link to a memory location, and the message retrieving component is configured to use that link to retrieve the message content from that memory location.

8. A method according to claim 7, wherein the operations further comprise notifying the user, via the user interface, that he can leave a message for retrieval via the luminaire.

9. A method according to claim 7, wherein the operations further comprise: rendering a text input region on a display of the user interface; and displaying a character string of the retrieved message directly on the display; wherein the message content of the left message comprises the character string generated by the user in the text input region.

10. A method according to claim 9, wherein the character string is inputted as text.

11. A method according to claim 7, wherein the operations further comprise causing a visible change in the light emitted by the luminaire for notifying the one or more recipient users of the left message.

12. A non-transitory computer program product for a computing device, the computer program product comprising computer program code to perform the method of claim 7 when the computer program product is run on a processing unit of the computing device.

* * * * *